(12) United States Patent
Heuver

(10) Patent No.: US 9,810,315 B1
(45) Date of Patent: Nov. 7, 2017

(54) VEHICLE AND SYSTEM OF CONTROLLING A VEHICLE TRANSMISSION

(71) Applicant: FORD GLOBAL TECHNOLOGIES, LLC, Dearborn, MI (US)

(72) Inventor: Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/210,466

(22) Filed: Jul. 14, 2016

(51) Int. Cl.
*F16H 61/00* (2006.01)
*F16H 61/02* (2006.01)
*F15B 1/02* (2006.01)

(52) U.S. Cl.
CPC ......... *F16H 61/0021* (2013.01); *F15B 1/024* (2013.01); *F16H 61/0206* (2013.01); *F16H 2061/0034* (2013.01)

(58) Field of Classification Search
None
See application file for complete search history.

(56) References Cited

U.S. PATENT DOCUMENTS

| 6,668,978 | B2 * | 12/2003 | Fessler | F16H 57/0434 184/6.1 |
| 6,896,636 | B2 * | 5/2005 | Fideler | F16H 57/0434 137/605 |
| 8,485,943 | B2 | 7/2013 | Sah et al. | |
| 8,801,573 | B2 | 8/2014 | Ohashi et al. | |

* cited by examiner

*Primary Examiner* — Dirk Wright
(74) *Attorney, Agent, or Firm* — James Dottavio; Brooks Kushman P.C.

(57) ABSTRACT

A vehicle includes a transmission having a fluid pump, a high pressure fluid circuit, a low pressure fluid circuit, and an accumulator. The vehicle also includes a controller that is programmed to, in response fluid demand exceeding a capacity of the pump, isolate the low pressure circuit from the pump. The controller is also programmed to, in response to vehicle speed exceeding a threshold while the low the pressure circuit is isolated from the pump, discharge the accumulator into the high pressure circuit.

20 Claims, 4 Drawing Sheets

VEHICLE AND SYSTEM OF CONTROLLING A VEHICLE TRANSMISSION

TECHNICAL FIELD

The present disclosure relates to a vehicle and a system of controlling a vehicle transmission.

BACKGROUND

Vehicle transmissions include fluid pumps that supply transmission fluid to clutches within the transmission to engage or disengage the clutches in order to establish multiple gear ratios between an input and an output of the transmission. The pumps may also supply transmission fluid to the contact surfaces of moving parts within the transmission to provide lubrication.

SUMMARY

A transmission includes a high pressure fluid circuit, a low pressure fluid circuit, a pump, a fluid accumulator, an output shaft, and a controller: The high pressure fluid circuit supplies fluid to actuate clutches. The low pressure fluid circuit supplies fluid to clutch pressure balance chambers. The pump is configured to supply fluid to the high and low pressure fluid circuits. The controller is programmed to, in response to fluid demand exceeding a capacity of the pump, isolate the low pressure circuit from the pump to prevent starving the high pressure circuit of fluid. The controller is also programmed to, in response to a speed of the output shaft exceeding a threshold while the low the pressure circuit is isolated from the pump, discharge the accumulator into the high pressure circuit. The controller is further programmed to, in response to fluid demand decreasing to less than the capacity of the pump, reconnect the low pressure circuit to the pump.

A vehicle includes a transmission having a fluid pump, a high pressure fluid circuit, a low pressure fluid circuit, and an accumulator. The vehicle also includes a controller that is programmed to, in response fluid demand exceeding a capacity of the pump, isolate the low pressure circuit from the pump. The controller is also programmed to, in response to vehicle speed exceeding a threshold while the low the pressure circuit is isolated from the pump, discharge the accumulator into the high pressure circuit.

A method includes pumping fluid into high and low pressure fluid circuits of a vehicle transmission and discharging fluid from an accumulator into the high pressure circuit in response to vehicle speed exceeding a threshold while the low pressure circuit is isolated from the pump.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
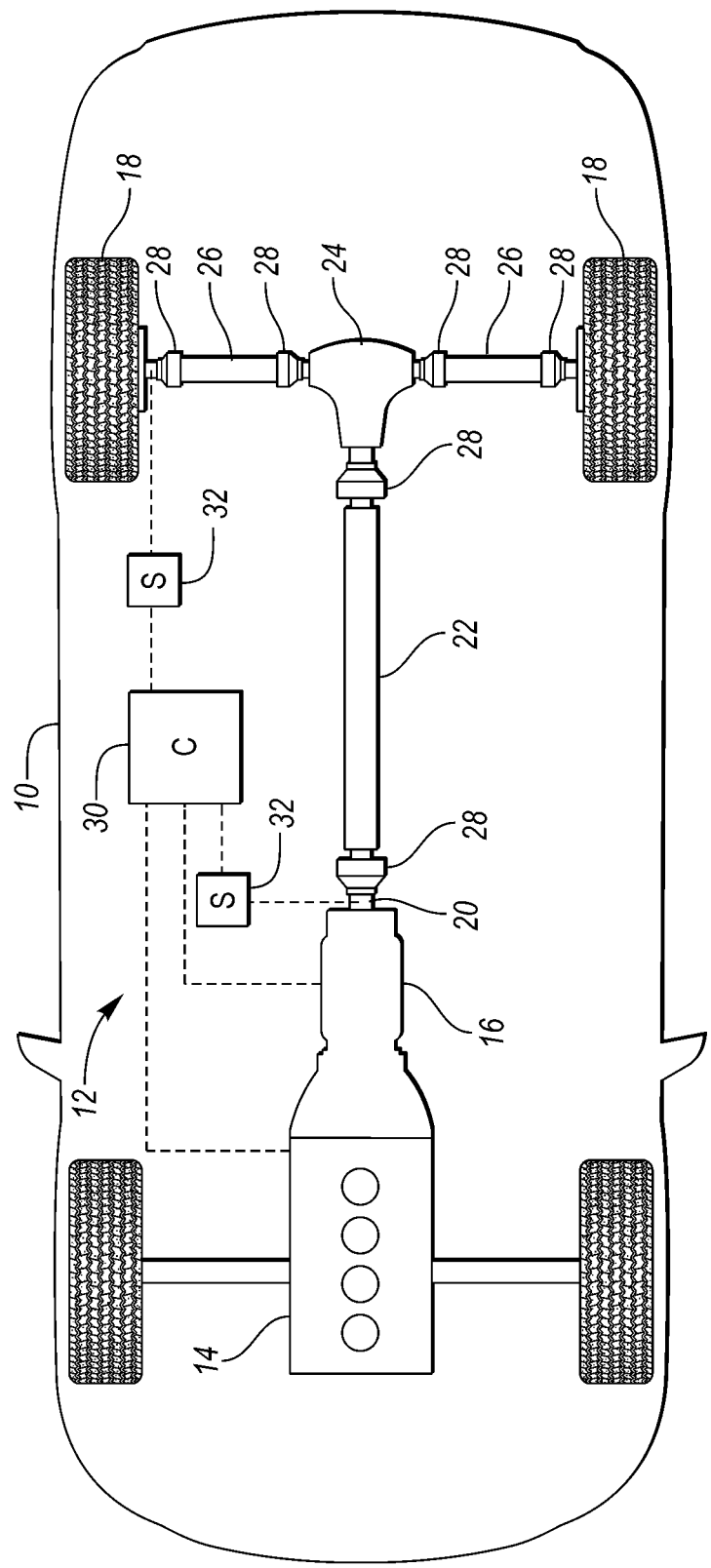
FIG. 1 is a schematic diagram representative of a vehicle and a vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16. The engine 14 is connected to the input of the transmission 16 while drivetrain components that are configured deliver power to driving wheels 18 are connected to an output shaft 20 of the transmission 16. The engine 14 may be connected to the input of the transmission by a torque converter or a launch clutch. More specifically, the output shaft 20 of the transmission 16 may be connected to a driveshaft 22. The driveshaft 22 may then be connected to a differential 24. The differential may then be connected to the driving wheels 18 by half shafts 26. The various components of the powertrain 12, including the output shaft 20 of the transmission 26, driveshaft 22, differential 24, half shafts 26 and driving wheels 18, may be connected to each other via constant-velocity joints 28.

The powertrain 12 further includes an associated controller 30 such as a powertrain control unit (PCU). While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions such as starting/stopping the engine 14, the amount power or torque being generated by the engine 14, operating an electric machine such as a motor/generator to provide wheel torque or charge a battery (in hybrid or electric vehicles), select or schedule shifts of the transmission 16, transition the transmission 16 to the desired gear based on an input from a gear selector, open/close an engine disconnect clutch (in vehicles where the engine may be disconnected from the powertrain), etc. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the engine 14 or vehicle 10.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle 10 may also include speed sensors 32 that are configured to communicate the current speed of the vehicle 10 to the controller 30. The speed sensors 32 may be configured to detect the rotational speed of the wheels (including the driving wheels 18 and the non-driving wheels), which in turn may be converted into the linear speed of the vehicle 10 by an algorithm stored in the controller 30. The vehicle speed may be based on a measured rotational speed of one wheel or may be an average of the measured rotational speeds of multiple wheels. Alternatively, a single speed sensor 32 may be configured to detect the rotational speed of the output shaft 20 of the transmission 16. The vehicle speed may be based on the measured rotational speed of the output shaft 20, which in turn may be converted into the linear speed of the vehicle 10 by an algorithm stored in the controller, taking into account the gearing ratio between the output of the transmission 16 and the driving wheels 18.

Figure 3:
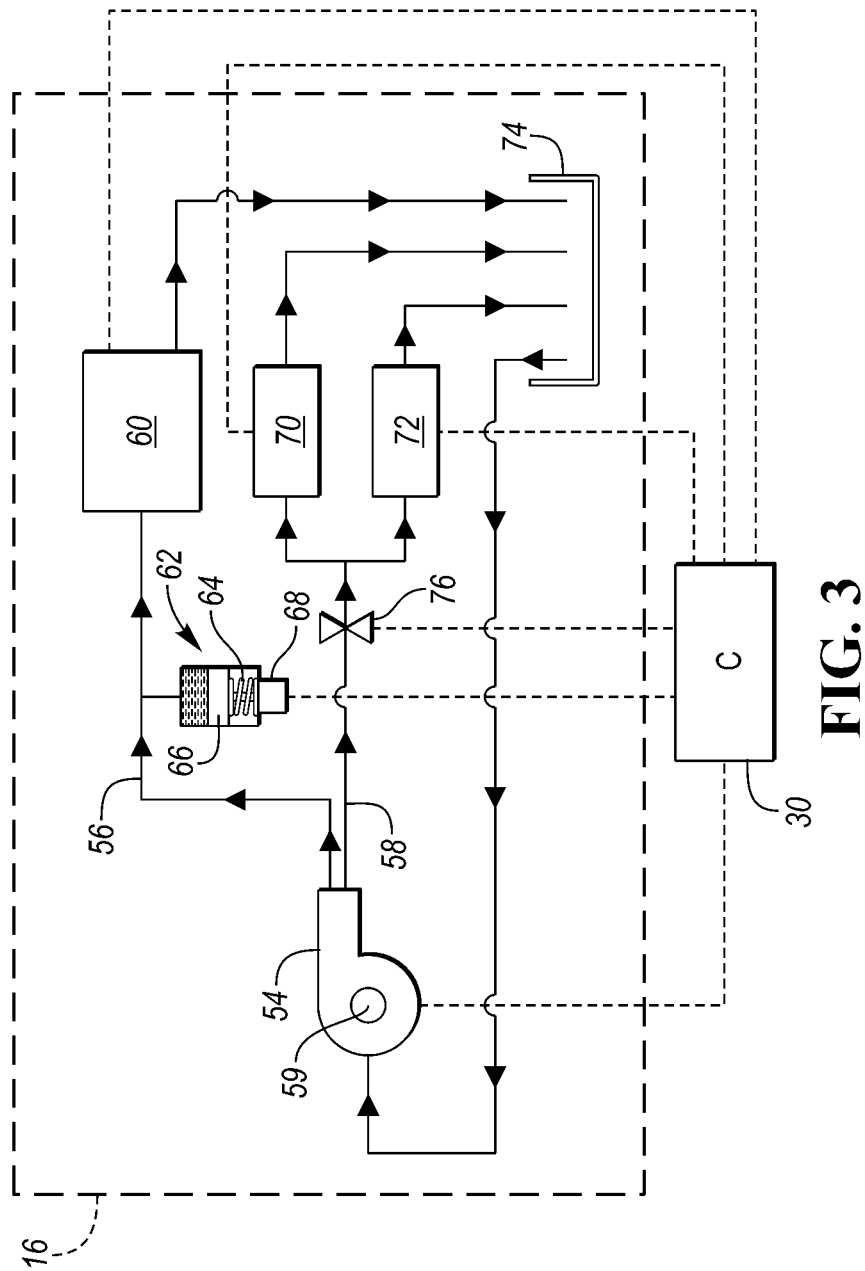
FIG. 3 is a schematic diagram representative of hydraulic fluid circuits in the vehicle transmission.

The controller 30 may be configured to receive various states or conditions of the various vehicle components illustrated in FIGS. 1 and 3 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIGS. 1 and 3. It should be understood that a single dotted line may be representative of both an input channel and an output channel into or out of a single element. Furthermore, an output channel into one element may operate as an input channel to another element and vice versa.

The driving wheels 18 depicted in FIG. 1 are shown as rear wheels of the vehicle 10. However, it should be understood that the front wheels may also be driving wheels. For example, the front wheels may be connected to the transmission 16 through a series of drivetrain components such as driveshafts, half shafts, differentials, transfer cases, constant-velocity joints, etc. in a manner similar to how the rear wheels are connected to the transmission 16, but not necessarily in the same order or configuration. Furthermore, although an engine 14 is shown to be the power generating component of the powertrain 12, other power generating components (i.e., electric motors or fuel cells) may be used in place of or in addition to (such as with hybrid vehicles) the engine 14.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

A group of elements (gears, shafts, etc.) are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a housing may be called a brake.

Clutches may be engaged when hydraulic fluid or an actuator (e.g., electrical motor or solenoid) forces a piston into contact with a clutch pack, consisting of alternating friction plates and separator plates. The friction plates may be fixed to a first rotating element while the separator plates are fixed to a second rotating element, or vice versa. Alternatively, the friction plates may be connected to a first rotating element while the separator plates are grounded to a housing or case (e.g., a transmission case), or vice versa. In this alternative configuration, where either the friction plates or separator plates are grounded to a case, a clutch may be referred to as a brake.

Figure 2:
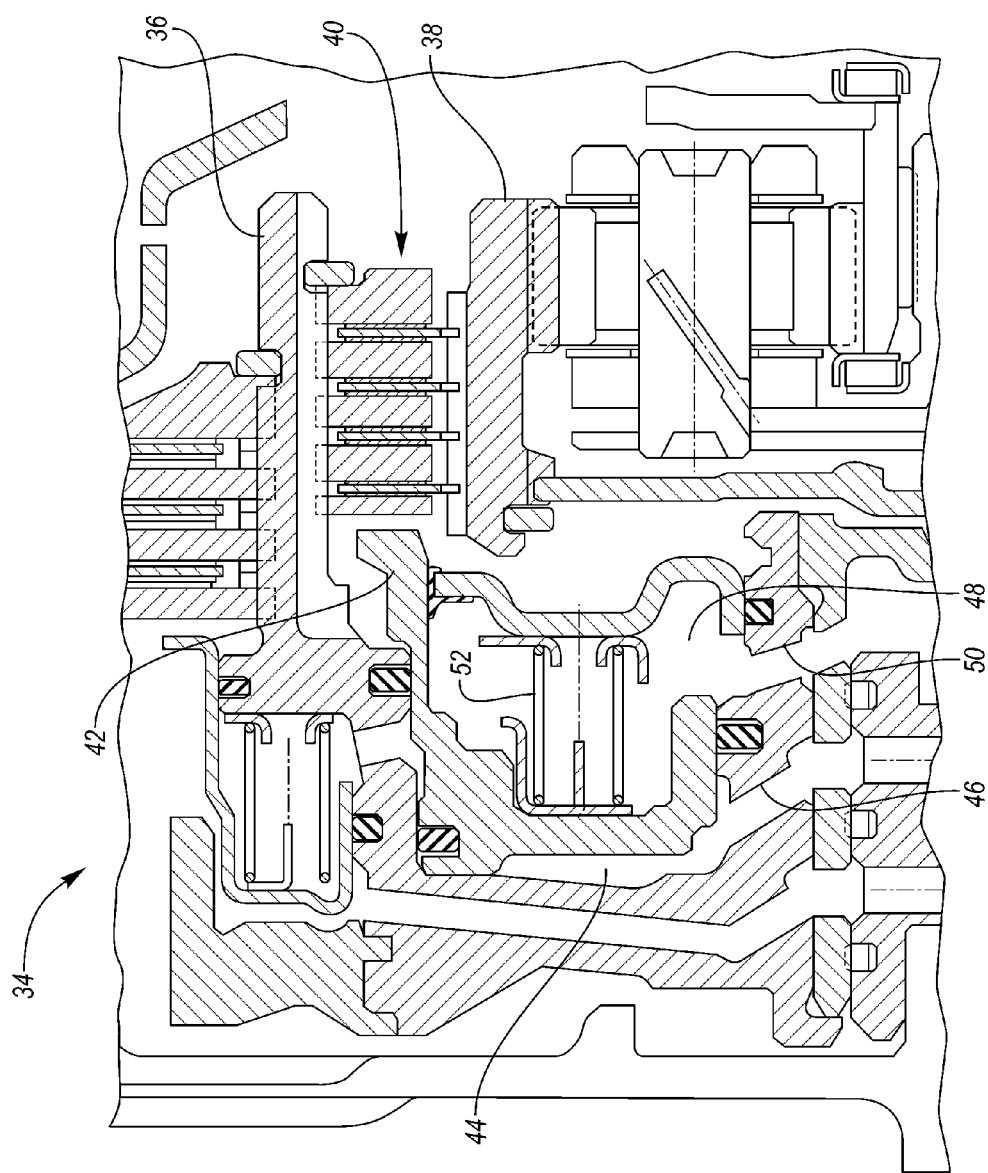
FIG. 2 is a cross-sectional view representative of a clutch in a vehicle transmission.

Referring to FIG. 2, a cross-sectional view representative of a clutch 34 located in the transmission 16 is illustrated. More specifically, the clutch 34 is a hydraulic clutch. The clutch 34 is configured to selectively couple a first rotating element 36 to a second rotating element 38. The clutch 34 includes a clutch pack 40 that includes friction plates and separator plates that are fixedly coupled, in alternating configuration, to either the first rotating element 36 or the second rotating element 38. A piston 42 is configured to engage and disengage the clutch pack 40 in order to couple and decouple the first rotating element 36 to and from the second rotating element 38. The piston 42 engages the clutch pack 40 when high pressure hydraulic fluid is directed into a chamber 44 located on an apply side of the piston 42. The high pressure hydraulic fluid may be directed into the chamber 44 through a first channel 46 that is connected to a high pressure fluid circuit of the transmission 16. Low pressure hydraulic fluid may also be directed into a balancing dam chamber 48 located on the opposing side of the piston relative to the chamber 44 located on the apply side of the piston 42. The low pressure hydraulic fluid may be directed into the balancing dam chamber 48 through a second channel 50 that is connected to a low pressure fluid circuit of the transmission 16. A balance dam creates a centrifugal hydraulic pressure that opposes and balances centrifugal hydraulic pressure developed in the chamber 44 located on the apply side of the piston 42. These centrifugal pressures are caused by rotation of the components of the clutch 42. Directing hydraulic fluid into the balance dam chamber 48 eliminates or reduces the pressure effects caused by the speed of rotation so that the control system pressure (i.e., the hydraulic pressure commanded to the chamber 44 located on the apply side of the piston 42) alone creates the necessary force for the piston 42 to engage the clutch pack 40. A compression spring 52 is configured to disengage the piston 42 from the clutch pack 40 when hydraulic fluid is vented from the chamber 44 located on the apply side of the piston 42. The hydraulic fluid may also be vented from the balancing dam chamber 48 while engaging the piston 42 and the clutch pack 40.

Referring to FIG. 3, a schematic diagram representative of hydraulic fluid circuits in the vehicle transmission 16 is illustrated. The transmission 16 includes a pump 54 that is configured to supply hydraulic fluid to both a high pressure hydraulic fluid circuit 56 and a low pressure hydraulic fluid circuit 58. The pump 54 may be driven by an input 59 to the transmission (e.g., a crankshaft of the engine 14 or a rotor of an electric motor in electric or hybrid vehicles). The pump 59 may be indirectly driven by an input 59 to the transmission 16 by a chain, belt, or series of gears.

The high pressure hydraulic fluid circuit 56 supplies high pressure hydraulic fluid to one or more clutches 60 in the transmission 16 in order to engage the one or more clutches 60. The clutches 60 may include similar corresponding components and may be engaged/disengaged in the same manner as clutch 34 as described above. For example, an individual clutch may be engaged when high pressure hydraulic fluid is directed into a chamber located on supply side of an individual clutch forcing a piston into contact with a clutch pack. The high pressure hydraulic fluid circuit 56 may also include a fluid accumulator 62 that is configured to store excess hydraulic fluid and equalize the pressure within the high pressure hydraulic fluid circuit 56. The fluid accumulator 62 may include a spring 64 or some other mechanism (such as a compressed gas chamber) that provides a force on a first side of a piston 66 of the accumulator in order to maintain a compressive force on the hydraulic fluid in the high pressure hydraulic fluid circuit 56 (the hydraulic fluid being exposed to a second side of the piston 66 that is opposed the first side of the piston 66). An actuator 68, such as an electric motor or electric solenoid, may be connected to the piston 66. The actuator 68 may be configured to adjust the position of the piston 66 in order to discharge additional hydraulic fluid into or increase the pressure of the high pressure hydraulic fluid circuit 56.

The low pressure hydraulic fluid circuit 58 supplies low pressure hydraulic fluid to balancing dam chambers 70 for each individual clutch of the one or more clutches 60 and to various lubrication points 72 (e.g., bearings or contact surfaces between moving parts such as shafts or gears) within the transmission 16. The transmission 16 may also include a sump 74. Hydraulic fluid may be configured to flow from the clutches 60 when transitioning from engaged to disengaged conditions and into the sump 74. More specifically, hydraulic fluid may be configured to flow from the chamber located on the apply side of the clutch and into the sump 74 when an individual clutch disengages. Also, hydraulic fluid may be configured to flow from the balance dam chambers 70 of a specific clutch and into the sump 74 while the clutch is engaging. Hydraulic fluid may further be configured to flow from the lubrication points 72 and into the sump 74. The sump 74 may be located at a low position within the transmission 16 such that hydraulic fluid is directed into the sump 74 via gravity. The pump 54 may be configured to draw hydraulic fluid from the sump 74 to supply hydraulic fluid to the high pressure hydraulic fluid circuit 56 and the low pressure hydraulic fluid circuit 58. The low pressure hydraulic fluid circuit 58 may include a valve 76 that is configured to isolate the low pressure hydraulic fluid circuit 58 from the pump 54. The low pressure hydraulic fluid circuit 58 may be isolated from the pump 54 during periods where the high pressure hydraulic fluid circuit 56 is prioritized due to a limited supply of pressurized hydraulic fluid.

The controller 30 may be configured to adjust various states of certain transmission components in response to various conditions of the transmission 16. For example, the controller 30 may be in communication with and configured to control the pump 54, clutches 60, accumulator 62, valve 76, etc. The controller 30 may be configured to engage and disengage the one or more clutches 60 by opening and closing valves (not shown) to direct fluid into and out of the chambers located on the apply side of each clutch and the balancing dam chambers of each clutch. The controller may engage or disengage individual clutches based on a shift schedule, operator input, or any other condition requiring the engagement or disengagement of an individual clutch. The controller 30 may also be configured activate the accumulator 62 (via the actuator 68) to discharge hydraulic fluid into the high pressure hydraulic fluid circuit 56 and transition valve 76 between opened and closed positions to either isolate or connect the low pressure hydraulic fluid circuit 56 to the pump 54. Additional valves (not shown) that are configured to isolate specific lubrication points 72 may also be controlled by the controller 30.

Figure 4:
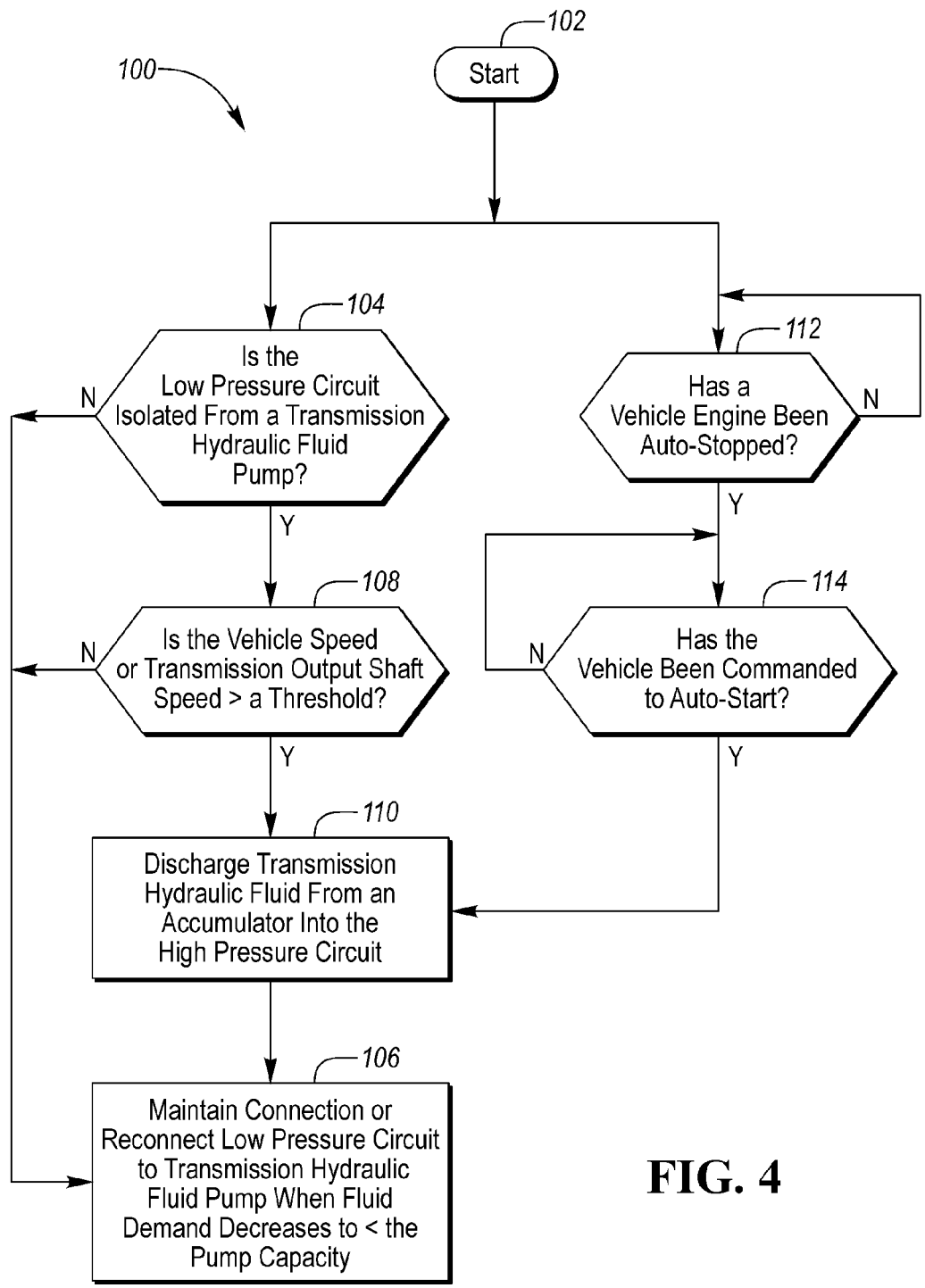
FIG. 4 is a flowchart illustrating a method of controlling the flow of hydraulic fluid in the vehicle transmission.

Referring to FIG. 4, a flowchart of a method 100 for controlling the flow of hydraulic fluid in the transmission 16 is illustrated. The method 100 may be stored as an algorithm and/or control logic within the controller 30. The controller 30 may be configured to implement the method 100 based on various conditions or states of the vehicle 10 and/or transmission 16. The method 100 may be initiated at the start block 102. Initiation of the method 100 may correspond to an operator turning on an ignition of the vehicle 10, adjusting a position of a gear selector of the transmission 16, pumping hydraulic fluid into the high and/or low hydraulic pressure circuits 56, 58, or any other triggering condition that may require operation of the method 100. Once the method 100 has been initiated at start block 102, it is determined at block 104 whether or not the low pressure hydraulic fluid circuit 58 has been isolated from the pump 54 by closing the valve 76. The controller 30 may be programmed to isolate the low pressure hydraulic fluid circuit 58 from the pump 54 to prevent starving the high pressure hydraulic fluid circuit 56 in response to hydraulic fluid demand exceeding a capacity of the pump 54. If the low pressure hydraulic fluid circuit 58 is not isolated from the pump 54, the method 100 maintains the connection of the low pressure hydraulic fluid circuit 58 to the pump 54 at block 106.

If the low pressure hydraulic fluid circuit 58 is isolated from the pump, the method 100 moves on to block 108 where it is determined whether or not the speed of the vehicle 10 or the transmission output shaft 20 is greater than a threshold speed. If the speed of the vehicle 10 or the transmission output shaft 20 is greater than a threshold speed, the method 100 moves on to block 110 where the controller 30 commands accumulator 62 to discharge hydraulic fluid into the high pressure hydraulic fluid circuit 56. Discharging hydraulic fluid from the accumulator 62 into the high pressure hydraulic fluid circuit 56, while the speed of the vehicle 10 or the transmission output shaft 20 is greater than a threshold speed, will maintain engagement of the clutches within the transmission 16 and ensure that adequate time is provided to recharge the accumulator 62 prior to the vehicle 10 coming to a complete stop. It is important to recharge the accumulator 62 prior to the vehicle 10 coming to a complete stop since the accumulator 62 may again be needed to discharge hydraulic fluid into the high pressure hydraulic fluid circuit 56 in order to engage the clutches within the transmission 16. More specifically, the accumulator 62 may be needed to discharge hydraulic fluid into the high pressure hydraulic fluid circuit 56 to engage the clutches when the vehicle 10 is commanded to accelerate while the engine 14 is auto-stopped. Discharging the accumulator 62 when the vehicle 10 is commanded to accelerate while the engine 14 is auto-stopped will ensure that the appropriate clutches in the transmission 16 engage even though the engine 14 is not providing power to operate the pump 54, which under normal circumstances supplies the hydraulic fluid to operate the clutches. If the speed of the vehicle 10 or the transmission output shaft 20 is not greater than the threshold speed at block 108 or after the accumulator 62 discharges hydraulic fluid into the high pressure hydraulic fluid circuit 56 at block 110, the method 100 moves on to block 106 where the controller 30 is program to reconnect the low pressure hydraulic fluid circuit 58 to the pump 54 once the hydraulic fluid demand decreases to a value that is less than the capacity of the pump 54.

Once the method 100 has been initiated at start block 102, it is also determined at block 112 whether or not the engine 14 has been auto-stopped. The controller 30 may be programmed to auto-stop the engine 14 in response to vehicle speed decreasing to a value that is less than a threshold speed while decelerating. Alternatively, the controller 30 may be programmed to auto-stop the engine 14 in response to vehicle speed obtaining a value of zero. Auto-stopping the engine 14 may also comprise disconnecting the engine 14 from the powertrain 12 with a disconnect clutch. Restarting (or auto-starting) the engine 14 after it has been auto stopped may comprise closing the disconnect clutch and/or engaging a starter motor. If it is determined at block 112 that the engine 14 has not been auto-stopped, the method 100 will repeat the step at block 112. If it is determined at block 112 that the engine 14 has been auto-stopped, the method 100 moves on to block 114 where it is determined whether or not the controller 30 has commanded the engine 14 to auto-start. If the controller 30 has not commanded the engine 14 to auto-start, the method 100 will repeat the step at block 114. If the controller 30 has commanded the engine 14 to auto-start, the method 100 will move on to block 110 where the controller 30 will command the accumulator 62 to discharge hydraulic fluid into the high pressure hydraulic fluid circuit 56. The accumulator 62 may be commanded to discharge prior to the engine 14 auto-starting.

It should be understood that the flowchart in FIG. 4 is for illustrative purposes only and that the method 100 should not be construed as limited to the flowchart in FIG. 4. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A transmission comprising:
   a high pressure fluid circuit that supplies fluid to actuate clutches;
   a low pressure fluid circuit that supplies fluid to clutch pressure balance chambers;
   a pump configured to supply fluid to the high and low pressure fluid circuits;
   a fluid accumulator;
   an output shaft; and
   a controller programmed to,
      in response to fluid demand exceeding a capacity of the pump, isolate the low pressure circuit from the pump to prevent starving the high pressure fluid circuit,
      in response to a speed of the output shaft exceeding a threshold while the low the pressure circuit is isolated from the pump, discharge the accumulator into the high pressure circuit, and
      in response to fluid demand decreasing to less than the capacity of the pump, reconnect the low pressure circuit to the pump.

2. The transmission of claim 1, further comprising a valve that transitions from an open position to a closed position to isolate the low pressure circuit from the pump.

3. The transmission of claim 1, wherein a speed sensor communicates rotational speed of the output shaft to the controller.

4. The transmission of claim 1, wherein the pump is driven by a transmission input.

5. A vehicle comprising:
a transmission having a fluid pump, a high pressure fluid circuit, a low pressure fluid circuit, and an accumulator; and
a controller programmed to,
in response fluid demand exceeding a capacity of the pump, isolate the low pressure circuit from the pump, and
in response to vehicle speed exceeding a threshold while the low the pressure circuit is isolated from the pump, discharge the accumulator into the high pressure circuit.

6. The vehicle of claim 5, further comprising an engine, and wherein the controller is programmed to, in response to vehicle speed obtaining a speed of zero, command the engine to auto-stop.

7. The vehicle of claim 6, wherein the controller is programmed to, in response to a command to auto-start the engine, discharge the accumulator into the high pressure circuit.

8. The vehicle of claim 5, further comprising an engine, and wherein the controller is programmed to, in response to vehicle speed decreasing to less than a threshold while decelerating, command the engine to auto-stop.

9. The vehicle of claim 8, wherein the controller is programmed to, in response to a command to auto-start the engine, discharge the accumulator into the high pressure circuit.

10. The vehicle of claim 5, further comprising a valve that transitions from an open position to a closed position to isolate the low pressure circuit from the pump.

11. The vehicle of claim 5, wherein high pressure circuit supplies fluid to actuate clutches within the transmission.

12. The vehicle of claim 5, wherein the low pressure circuit supplies fluid to clutch pressure balance chambers.

13. The vehicle of claim 5, wherein the controller is programmed to, in response to fluid demand decreasing to less than the capacity of the pump, reconnect the low pressure circuit to the pump.

14. A method comprising:
pumping fluid into high and low pressure fluid circuits of a vehicle transmission with a fluid pump; and
discharging fluid from an accumulator into the high pressure circuit in response to vehicle speed exceeding a threshold while the low pressure circuit is isolated from the pump.

15. The method of claim 14, further comprising auto-stopping a vehicle engine in response to vehicle speed obtaining a speed of zero.

16. The method of claim 15, further comprising discharging fluid from the accumulator in response to auto-starting the vehicle engine.

17. The method of claim 14, further comprising auto-stopping a vehicle engine in response to vehicle speed decreasing to less than a threshold while decelerating.

18. The method of claim 17, further comprising discharging fluid from the accumulator in response to auto-starting the vehicle engine.

19. The method of claim 14, further comprising isolating the low pressure circuit from a pump in response to fluid demand exceeding a pump capacity.

20. The method of claim 14, wherein the low pressure circuit supplies fluid to clutch pressure balance chambers and the high pressure circuit supplies fluid to actuate clutches within the vehicle transmission.

\* \* \* \* \*